Figure 4:
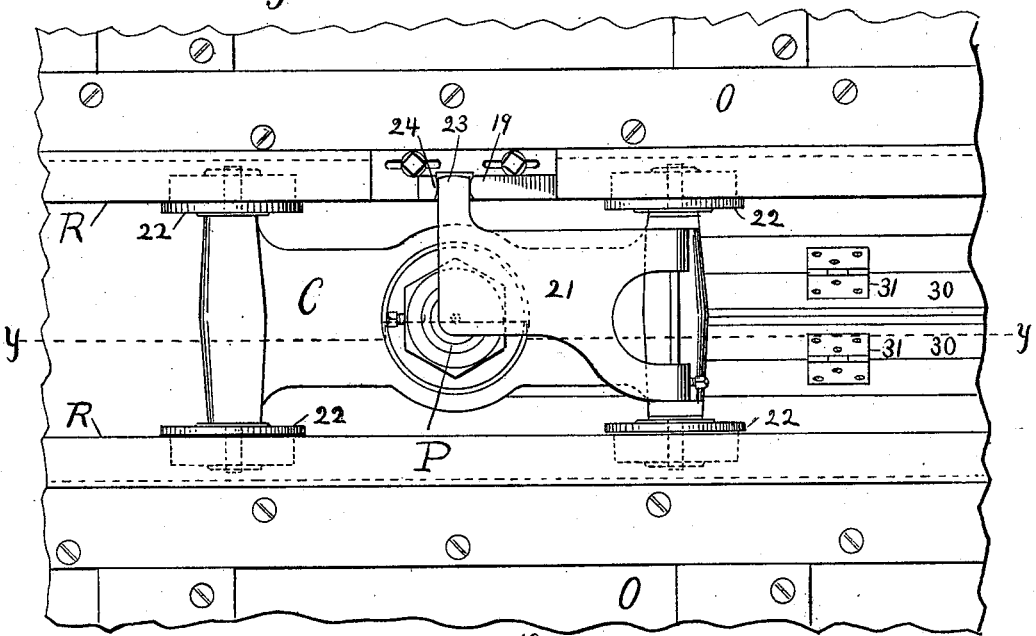
Figure 4A:
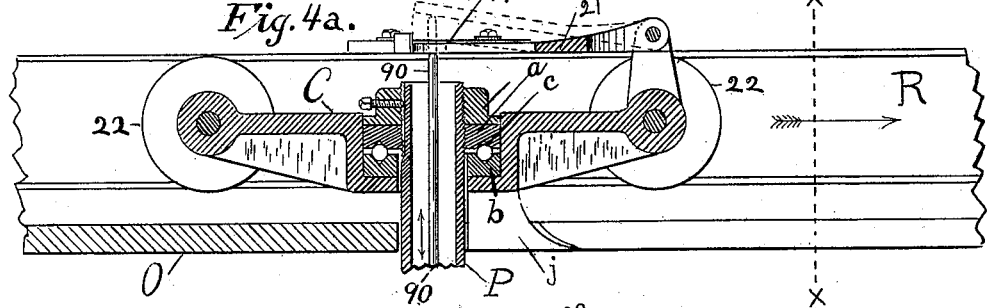
Figure 4B:
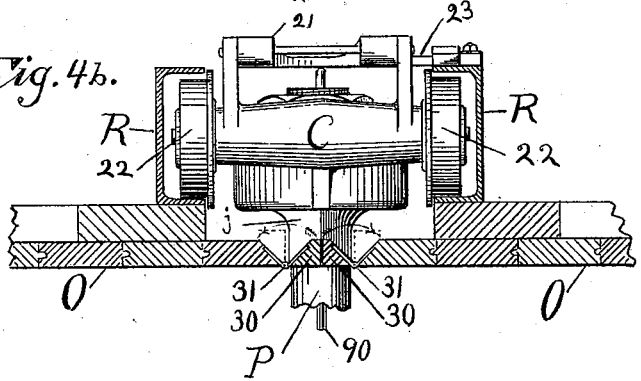

(No Model.) 5 Sheets—Sheet 1.
T. VAN KANNEL.
STORM DOOR STRUCTURE.
No. 588,620. Patented Aug. 24, 1897.
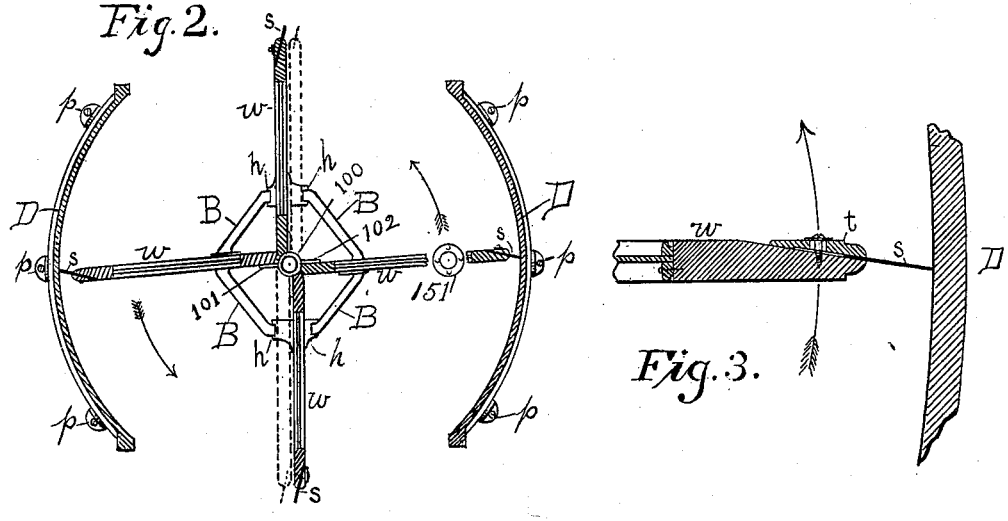
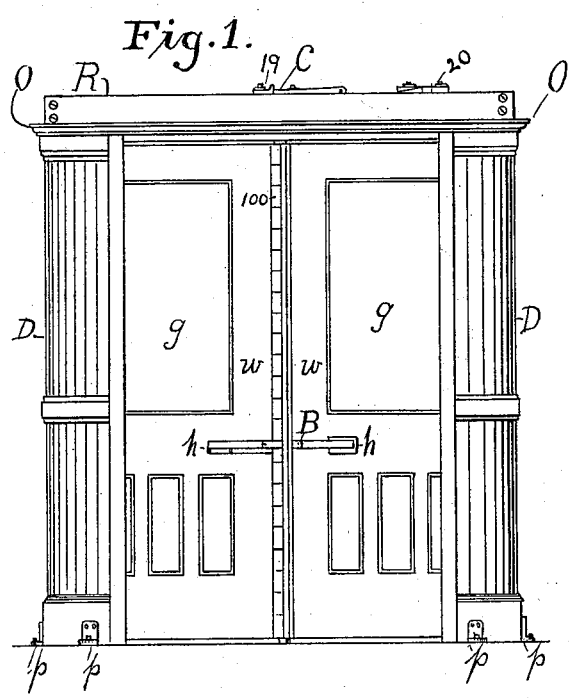
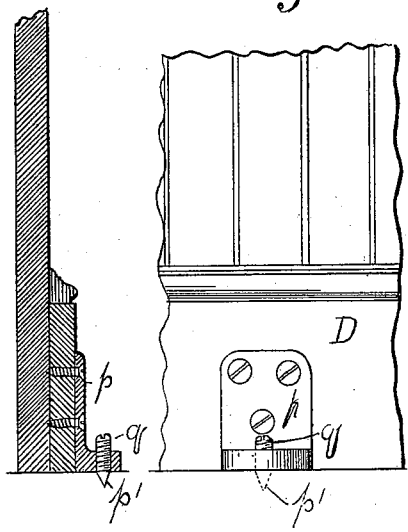
WITNESSES:
INVENTOR
ATTORNEY (No Model.) 5 Sheets—Sheet 2.

T. VAN KANNEL.
STORM DOOR STRUCTURE.

No. 588,620. Patented Aug. 24, 1897.

WITNESSES: INVENTOR
ATTORNEY.

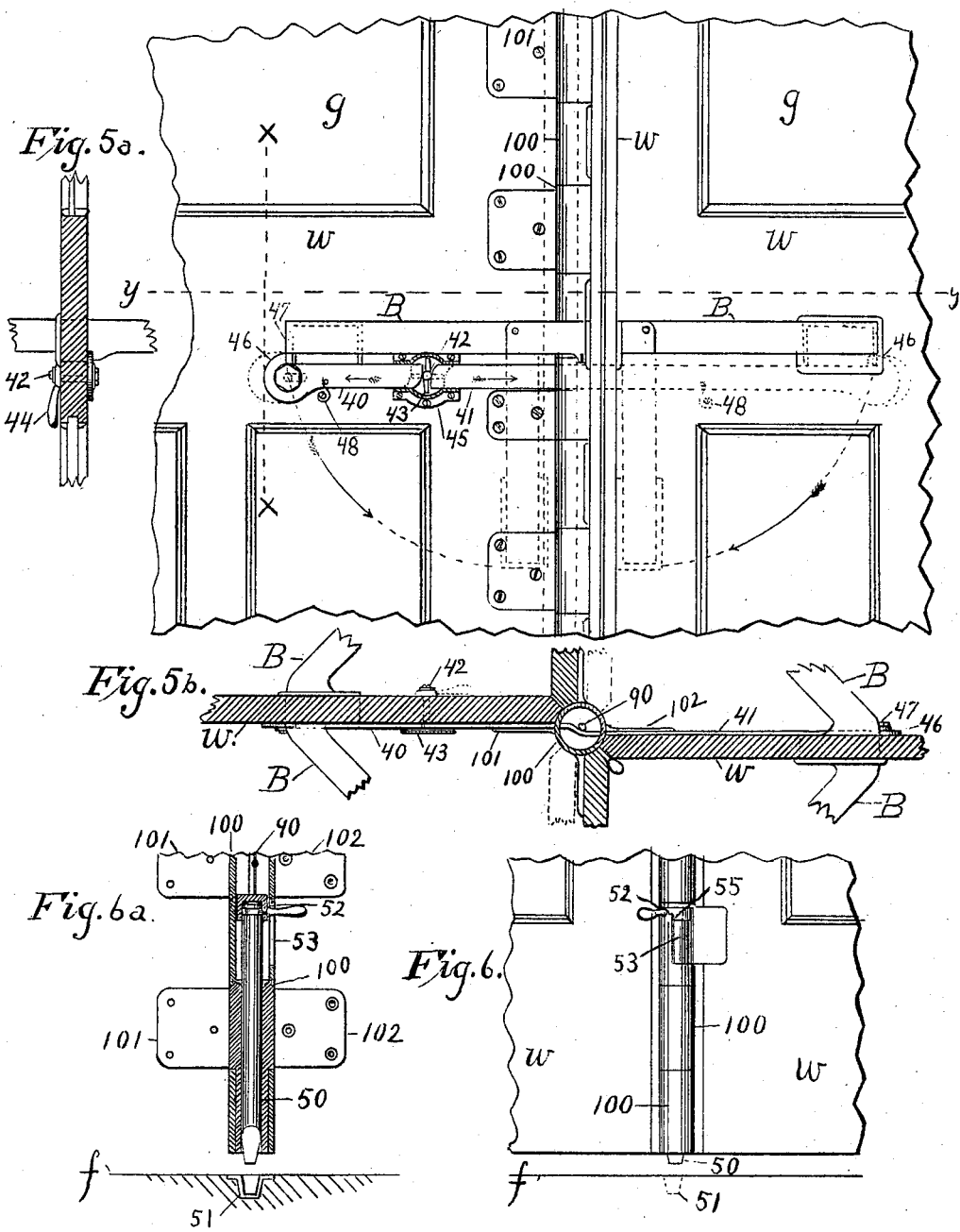

(No Model.)  
5 Sheets—Sheet 4.
T. VAN KANNEL.
STORM DOOR STRUCTURE.
No. 588,620.  
Patented Aug. 24, 1897.
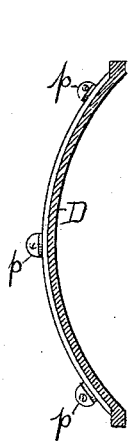
Fig. 8.
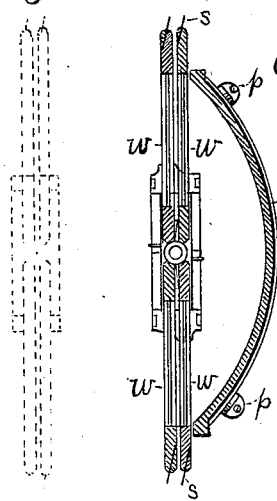
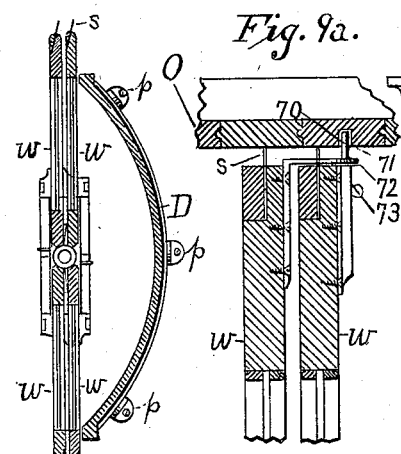
Fig. 9a.
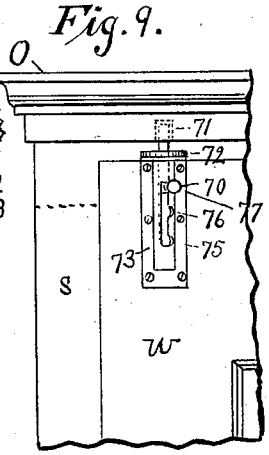
Fig. 9.
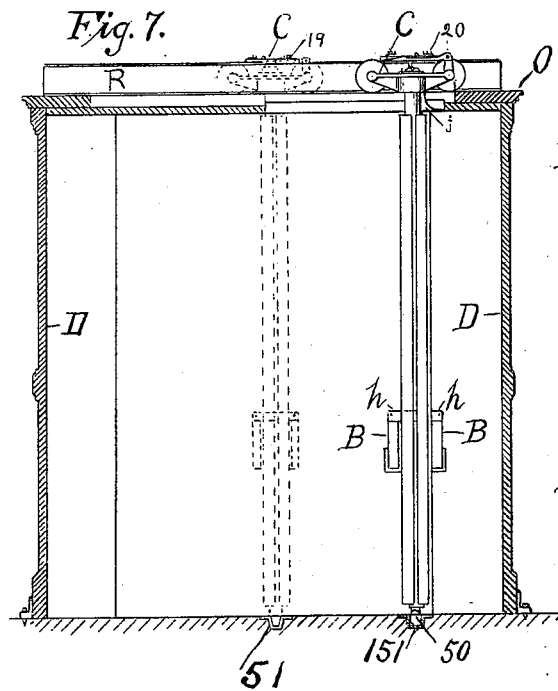
Fig. 7.
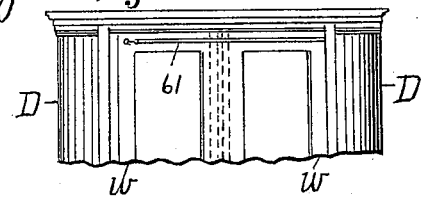
Fig. 10a.
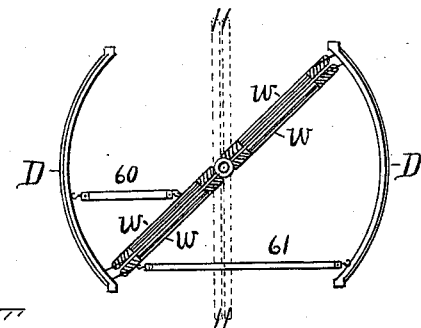
Fig. 10.
WITNESSES:  
Walter D. Place  
John Doran
INVENTOR  
Theophilus Van Kannel  
BY  
M. S. Varnsize  
ATTORNEY (No Model.) 5 Sheets—Sheet 5.

T. VAN KANNEL.
STORM DOOR STRUCTURE.

No. 588,620. Patented Aug. 24, 1897.

WITNESSES:
Walter S. Place
John Doran

INVENTOR
Theophilus Van Kannel
BY Wm. B. Vansize
ATTORNEY

UNITED STATES PATENT OFFICE.

THEOPHILUS VAN KANNEL, OF NEW YORK, N. Y., ASSIGNOR TO THE VAN KANNEL REVOLVING DOOR COMPANY, OF SAME PLACE.

STORM-DOOR STRUCTURE.

SPECIFICATION forming part of Letters Patent No. 588,620, dated August 24, 1897.

Application filed March 26, 1897. Serial No. 629,321. (No model.)

*To all whom it may concern:*

Be it known that I, THEOPHILUS VAN KANNEL, a citizen of the United States, and a resident of New York, in the county and State of New York, have made certain new and useful Improvements in Storm-Door Structures, of which the following is a specification.

My invention is an improvement in storm-door structures.

The object of my invention is to prevent drafts of air and changes in temperature in office-buildings, hotels, and halls during frequent entrance and exit.

I provide a doorway having the opposite sides in the form of an arc or segment of a circle or polygon. The door is preferably composed of a series of radial wings rigidly united in pairs, the pairs of wings being adjustably united at a central junction-line, so as to permit of fixing them in planes either parallel or at any required angle with respect to each other. The door structure is suspended from an overhead surface, ceiling, or roof by means of a rotating support, and this rotating support is located on a wheeled carriage moving on a track arranged transverse the doorway. The rotating support or pivot depends through a slot or passage in the roof or ceiling, and there is a hinged cover for the slot operated by a projection from the carriage. Stops are provided to catch and hold the carriage at the limit of its movement. The contact surface or edge of each radial wing is provided with a fixed strip of flexible yielding material, like rubber cloth, and this strip is fixed at an angle with respect to the plane of the wing in such manner that the door moves freely when rotated in one direction only, while the rubber strip impinges against the walls of the doorway and operates to resist rotation when attempt is made to rotate the structure in the opposite direction.

I provide novel and useful devices for locking the doors together and bracing them, also for locking pairs of wings together and to a fixed point in certain instances, also for limiting the movement of pairs of wings under the influence of a retracting device when it is desirable to ventilate the interior while the door is in position and in use. I also provide a non-rotating steadying pin or pivot which is longitudinally movable, with means for holding said pin against displacement.

The accompanying drawings illustrate my invention.

Figure 12:
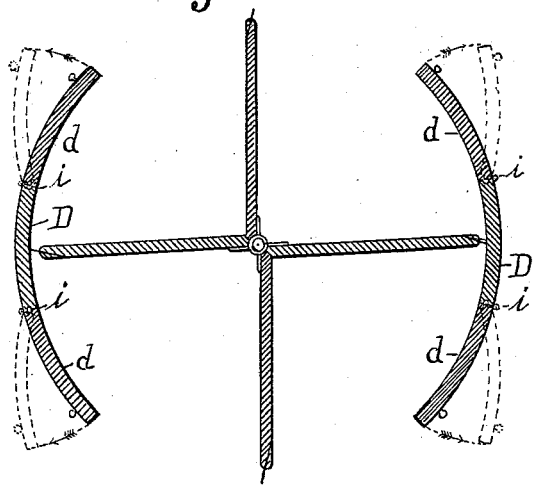
Figure 14:
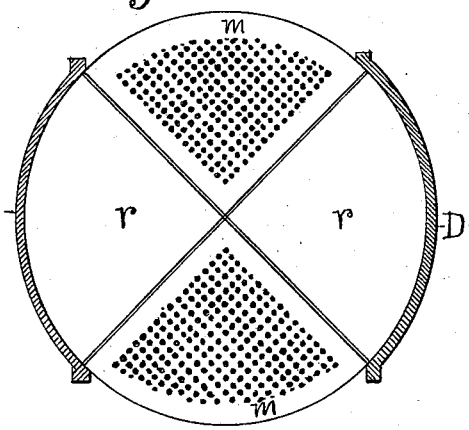
Figure 11:
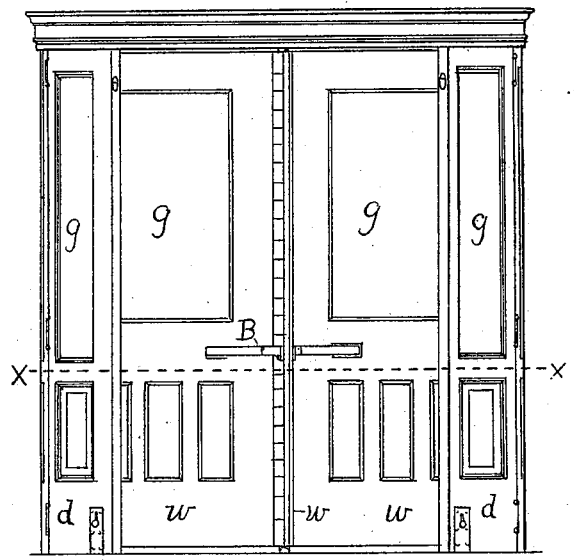
Figure 13:
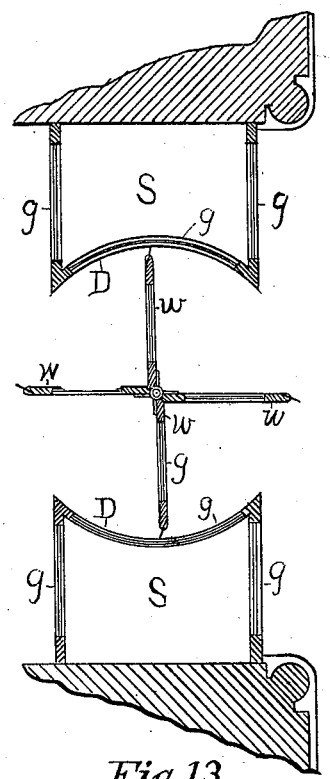

Figure 1 is an elevation of the doorway and rotating door structure. Figs. 1$^a$ and 1$^b$ are detail views showing the means employed for fixing the arc-shaped doorway firmly in position on a hard floor or sidewalk, as of stone. Fig. 2 is a cross-section of the doorway and door as shown in Fig. 1. Fig. 3 is a detail view showing the flexible strip fixed at an angle with respect to the plane of the wing upon which it is located. Fig. 4 is a top plan view of the overhead surface, the rails, the carriage, the rotating support, the slot, and the hinged cover therefor. Fig. 4$^a$ is a longitudinal cross-section on the line $y\ y$, Fig. 4. Fig. 4$^b$ is an end view of the carriage and attachments shown in Figs. 4 and 4$^a$, taken on the line $x\ x$, Fig. 4$^a$. Fig. 5 shows the means for adjustably connecting pairs of wings at a central line and the means employed for locking the hinged braces. Fig. 5$^a$ is a detail view on the line $x\ x$, Fig. 5. Fig. 5$^b$ is a sectional view on the line $y\ y$, Fig. 5. Fig. 6 shows the lower pivot with means for controlling its position by the movement of the wings of the suspended door structure. Fig. 6$^a$ is a vertical cross-section of Fig. 6. Fig. 7 shows the wings arranged in parallel planes at one side of the doorway. Fig. 8 is a cross-section of Fig. 7. Figs. 9 and 9$^a$ show the means for locking the doors in parallel planes and to a fixed point. Fig. 10 shows the pairs of wings in parallel planes arranged for use and ventilation. Fig. 10$^a$ is a vertical sectional view of the door structure arranged as shown in Fig. 10. Fig. 11 is an elevation showing the central braces in position and the door structure and doorway constructed partly of glass. Fig. 12 is a cross-section on the line $x\ x$, Fig. 11, the arc-shaped doorway divided into sections hinged together. Fig. 13 shows the glass doorway forming part of show-cases for exhibiting goods for sale, and Fig. 14 shows the perforate and imperforate floor-covering arranged to form a receptacle for the dust and dirt moved to and fro by the revolving structure.

In Fig. 1, D is a doorway in the form of an arc, the extent of the arc being slightly greater than the distance between successive wings. These arc-shaped doorways are fixed to the floor or sidewalk or vestibule surface, frequently of stone, by angle-pieces of metal $p$, which are screwed to the doorway by ordinary wood-screws and held in place on the floor-surface by screws, like $q$, having a long conical point $p'$. The door structure, as shown, is composed of four wings $w$, opposite wings being rigidly united into pairs, the two pairs being adjustably united. The means preferred for securing the described union is a series of cylindrical sections, preferably tubular. At diametrically opposite points of each cylindrical section 100 there are fixed projecting flanges 101 and 102. The flanges are screwed to the wings and rigidly unite them. A series of these flanged tubular sections are superposed. One series of alternate sections are firmly fixed to the wings constituting one pair, and the other series of alternate sections are firmly fixed to the wings constituting the other pair—that is, alternate sections 100 have flanges secured to alternate pairs $w$—so that the pairs of wings may be placed at any angle with respect to each other or in parallel planes in proximity, all as shown in Figs. 2, 7, and 8. The door structure is suspended from a rotating support or pivot P. There is an overhead surface, structure, ceiling, or roof O, upon which is located a track—for instance, two parallel rails R—of merchant iron, as shown in Figs. 1, 4, $4^a$, and $4^b$. A wheeled carriage C travels between a central point and one side of the doorway, and there is a grooved plate $b$ upon the carriage and a grooved plate $a$ attached to the pivot P, with balls $c$ located in the grooves, as shown in Fig. $4^a$. The wheels 22, upon which the structure is supported, are preferably flanged. At opposite limits of movement of the carriage there are stops 19 and 20, (shown in Fig. 1,) and there is a latch or movable stop 21 upon the carriage. The stops 19 and 20 are provided with slanting contact-surfaces. A projection 23, forming part of the movable stop, rides upon the slanting surface of a fixed stop and then drops into a notch, like 24, in the fixed stop 19. (Shown in Fig. 4.) There are covers 30 for the slot in the ceiling O, through which the pivot P passes or depends, and these covers 30 are hinged at 31, (see Figs. 4 and $4^b$,) and there is an angular plow-shaped projection $j$, forming part of the carriage C, arranged to lift the covers 30 as the carriage moves from one limit to the other, allowing the covers to drop back into position to cover the slot upon completion of the movement. The vertical contact-surface of each wing is provided with a flexible strip $s$, bridging the space between the wings $w$ and the doorway D, sufficient in extent to prevent catching or pinching the fingers of the passer. The strips $s$ are preferably of rubber or rubber cloth placed at an angle with respect to the plane of the wing $w$ and fixed to the wing by a bevel-strip $t$, of rigid material, and screws.

The location of the strip at an angle permits rotation of the door structure freely in one direction and practically prevents rotation in the reverse direction. The horizontal contact-surfaces of each wing may have the same arrangement of flexible strips $s$, or the strip on such surfaces may be in the plane of the wing.

Referring to Fig. 2, there are central braces B connected to one pair of wings at their opposite extremities by hinges $h$. These braces pass through the wings of the opposite pair at points some radial distance from the center, and I provide a locking device for locking the wings at such radial points or perforations to the braces passing through them. This locking device is shown in Figs. 5, $5^a$, and $5^b$. There are two bars 40 and 41, having their ends adjacent. Both bars are suitably supported in bearings and their adjacent ends are arc-shaped. There is a winged actuating device 43, located upon a bolt 42, having a controlling-handle 44. The adjacent ends of the bars 40 and 41 and the winged actuating device 43 are in a case 45. The bars 40 and 41 have a normal tendency to approach and make contact with the actuating device 43, imparted thereto by means of springs 48, and when in this position a projection 46 on the exterior end of each bar enters a notch 47 in the brace B, and when the winged actuating device 43 is rotated forty-five degrees the bars are forced apart and the projections 46 are freed from the notches 47. At this time one pair of wings may be swung around into a parallel plane with respect to the wings of the first pair. The hinges $h$, upon which central braces B are supported, extend or project a sufficient distance to pass through the wings of the second pair and allow the braces B to drop into a vertical position when the wings are placed together, as shown in Fig. 2.

For the purpose of steadying the suspended door structure I provide a lower pivot 50, extending through two or more of the cylindrical sections 100. Its lower end is squared and enters a squared socket 51 in the floor or lower surface $f$, the object being to prevent rotation of the pivot and avoid the wear due to accumulating dust. The upper end of the pivot is provided with an actuating-handle 52, taking into a groove near the upper end of pivot 50. This handle 52 travels in a slot 53, and this slot at its upper end takes a right-angled turn, forming a shoulder at 55, so that when the pairs of wings are located at right angles with respect to each other movement of the handle 52 is prevented by the presence or location of the wing $w$, which partially covers the angular passage or slot and operates to block the movement of the pivot 50. The object of this arrangement is to prevent mischievous or unauthorized interference. I provide a mechanical connection 90 between the movable stop 21 and the lower pivot 50, so that when pivot 50 is raised the catch 21 will be thrown up and free the carriage. When the cylindrical sections are tubular, this mechanical connection is in the form of the rod 90, passing through the tubular sections.

When the doors are constructed and arranged as described and as shown in Fig. 2, entrance is at the right, and the admission of air and dust is practically prevented, because one wing $w$ closes with respect to the doorway D before the preceding wing leaves the doorway. The pairs of wings may be arranged in parallel planes at the center, as shown in dotted lines in Figs. 7 and 8, or they may be arranged at one side of the doorway, as shown in full lines in Figs. 7 and 8, or they may be arranged in parallel planes free to vibrate and regulate the ventilation in warm weather, for instance, as shown in Figs. 10 and $10^a$.

For the purpose of arranging the doors as shown in full lines in Figs. 7 and 8 I provide a bolt 70, journaled upon one pair of wings, and a link 72, fixed to the second pair of wings, projects into the line of movement of the bolt 70. To lock the wings together and at the side of the doorway, the bolt 70 is passed through the link 72 and into socket 71 in the overhead structure, and the lower pivot 50 is passed into a socket 151. (Shown in Fig. 7.) To hold the pairs of wings in parallel planes and permit their vibration together, as shown in Fig. 10, I cause the bolt 70 to enter the link 72 and provide an elevated flexible strap or connection 61 to limit the movement of the door structure in one direction and an elastic or retractile connection 60, which may be a helical spring or strip of rubber or equivalent device, to return the doors to the limit established by the flexible strap 61. The case 73 for the bolt 70 has three stops or notches. When the handle of the bolt 70 is in the notch 75, the wings may be separated, when in the notch 76 the two pairs of wings are united, and when in the notch 77 the pairs are united together and to the fixed point in the roof 71.

In Fig. 11 I have shown a door and doorway, parts of both of which are formed of glass $g$. In Fig. 13 I have shown a doorway D of glass $g$, forming the wall of a show-case S, in which goods may be displayed.

In Fig. 12 I have shown a doorway D of arc shape, divided into minor arcs, hinged together at $i$, so as to minimize the obstruction due to the curvature of the doorway in case it is desired to move bulky articles.

In Fig. 14 I have shown a floor-covering divided into quadrants, the quadrants $m$, located in the space between the sides of the doorway, being perforated to receive dust and dirt moved over the surface, while the quadrants $r$, adjacent to the sides of the doorway, are imperforate, thus preventing the passage of air around the edge of the flexible strip forming the contact-surface of the wing.

I do not herein claim the door and doorway formed of glass and forming part of a show-case or the arc-shaped doorway divided into hinged sections or the floor-covering formed of quadrants alternately perforate and imperforate, as such improvements form the subject-matter of a pending application.

What I claim, and desire to secure by Letters Patent, is—

1. In a storm-door structure the combination of a doorway and a door therefor having a series of radial wings united at a central line, means for adjustably connecting pairs with respect to each other, a rotating suspension device for said door depending from an elevated surface or structure, said surface or structure in area equaling the area covered by the revolving door, a wheeled carriage supporting said device, a track for said carriage extending transverse the doorway, fixed stops at the limits of movement of said carriage, and a movable stop carried by the carriage to engage either fixed stop, substantially as described.

2. In a storm-door structure the combination of a doorway with a door therefor having a series of radial wings united at a central line, a projecting roof or cover for the door, a pivot located upon said roof supporting the door and permitting free rotation thereof, a slot or passage in the roof through which said pivot passes, and a hinged cover for the slot, substantially as described.

3. In a storm-door structure the combination of a doorway with a door therefor having a series of radial wings untied at a central line, a projecting roof or cover for the door, a pivot from which said door is suspended, a wheeled truck supporting said pivot, a slot or passage in the roof through which said pivot passes, a hinged cover for said slot or passage and a projection from the truck in position to engage said hinged cover, substantially as described.

4. In a storm-door structure the combination of a doorway with a door having a series of radial wings united at a central line, means for adjustably connecting pairs of wings with respect to each other, a pivot from which said door is suspended, means for moving said pivot transversely upon its support, a catch for holding said pivot in position, a longitudinally-movable lower pivot connecting said door with a fixed point below it and a movable mechanical connection between said lower pivot and said catch whereby the lifting of the lower pivot releases the catch, substantially as described.

5. The combination in a revolving storm-door structure of a series of radial wings united in pairs, means for connecting the wings of each pair rigidly together, and means for adjustably connecting pairs with respect to each other, substantially as described.

6. The combination in a revolving storm-door structure of four radial wings united in pairs by a series of separate sections having flanges fixed thereto at diametrically opposite points, said sections being superposed and the flanges of alternate sections connected to each pair of wings, substantially as described.

7. The combination in a revolving storm-door structure of radial wings united in pairs by a rigid connection, and a hinge connection at the central vertical line of the pairs whereat said wings may be placed in parallel planes or at any angle with respect to each other, substantially as described.

8. The combination in a revolving storm-door structure of a series of wings united in pairs by a rigid connection, a hinge connection between separate pairs and means for locking said pairs together in parallel planes, substantially as described.

9. The combination in a revolving storm-door structure of a series of wings united in pairs by a rigid connection, a hinge connection between separate pairs and means for locking said pairs together in parallel planes and to the casing, substantially as described.

10. The combination in a revolving storm-door structure of a series of wings united in pairs, a hinge connection between pairs, a bolt for locking one pair to a fixed point in the casing, and a link fixed to a second pair in position to engage the bolt between the first pair and the fixed point in the casing, substantially as described.

11. The combination in a revolving storm-door structure of a series of wings united in pairs, a hinge connection between pairs, a bolt located on one pair of wings for locking said pair to a fixed point in the casing, a link fixed to a second pair of wings and extending into the line of movement of said bolt between said door and fixed point and means for holding the bolt in three positions; to wit completely withdrawn, in position to unite the first and second pairs of doors, in position to unite said pairs together and to the fixed point, substantially as described.

12. In a storm-door structure the combination of a door having radial wings adjustably united at a central junction-line and a brace having its opposite ends hinged to each of a pair of wings and passing through a third wing, substantially as described.

13. In a storm-door structure the combination of a door having four radial wings united in pairs, said pairs being adjustably united at a central line and braces hinged upon opposite sides of one pair, each brace passing through a wing of a second pair, substantially as described.

14. In a storm-door structure the combination of a door having four radial wings united in pairs, said pairs being adjustably united at a central junction-line, a brace hinged upon each wing of one pair and means for locking said brace in position, substantially as described.

15. In a storm-door structure the combination of a series of wings adjustably united at a central junction-line, a brace hinged to each wing of a pair and extending through one wing of a second pair, said brace-hinges being located upon projections extending at least the thickness of a wing from the wing upon which they are supported, substantially as described.

16. In a storm-door structure the combination of a series of radial wings united in pairs, said pairs being adjustably united at a central junction-line, a rotating suspended support for said door, a lower pin entering a fixed socket below it, and means for moving said pin longitudinally and holding it in either of two positions, said means consisting of a slot or channel in the pin-case in position to be covered and uncovered by the movement of one of the radial wings, substantially as described.

17. In a storm-door structure the combination of a doorway and a door having a series of radial wings united in pairs, means for fixing said wings together in parallel planes and a retracting device for returning the parallel wings to any predetermined angular position with respect to the doorway, substantially as described.

18. In a storm-door structure the combination of a doorway, a door having a series of radial wings united in pairs, means for fixing said wings together in parallel planes, a device for limiting the movement of said wings in one direction, and a retracting device for returning the parallel wings to a predetermined angular position with respect to the doorway, substantially as described.

THEOPHILUS VAN KANNEL.

Witnesses:
SAML. G. CURRIE,
WALTER S. PLACE.